US011940628B2

(12) United States Patent
Chatterjee et al.

(10) Patent No.: US 11,940,628 B2
(45) Date of Patent: Mar. 26, 2024

(54) DISPLAY DEVICE HAVING COMMON LIGHT PATH REGION

(71) Applicant: Microsoft Technology Licensing, LLC, Redmond, WA (US)

(72) Inventors: Ishan Chatterjee, Mountain View, CA (US); Dmitry Reshidko, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/648,534

(22) Filed: Jan. 20, 2022

(65) Prior Publication Data

US 2023/0228996 A1    Jul. 20, 2023

(51) Int. Cl.
| | | |
|---|---|---|
| *G02B 27/01* | (2006.01) | |
| *G02B 26/08* | (2006.01) | |
| *G02F 1/1362* | (2006.01) | |
| *G02B 6/26* | (2006.01) | |

(52) U.S. Cl.
CPC ..... *G02B 27/0172* (2013.01); *G02B 26/0833* (2013.01); *G02F 1/136277* (2013.01); *G02B 6/26* (2013.01); *G02B 2027/0178* (2013.01); *G02F 2203/12* (2013.01)

(58) Field of Classification Search
CPC .................................................. G02B 27/0172
See application file for complete search history.

(56) References Cited

U.S. PATENT DOCUMENTS

| | | | |
|---|---|---|---|
| 2018/0052501 A1 | 2/2018 | Jones et al. | |
| 2018/0284585 A1 | 10/2018 | Trisnadi et al. | |
| 2020/0249754 A1* | 8/2020 | Morozov | G02B 6/0023 |
| 2023/0103120 A1* | 3/2023 | Seo | G02B 27/0172 |
| | | | 359/630 |

FOREIGN PATENT DOCUMENTS

WO    9102429 A1    2/1991

OTHER PUBLICATIONS

"International Search Report and Written Opinion Issued in PCT Application No. PCT/US2022/048123", dated Feb. 20, 2023, 11 Pages.

* cited by examiner

*Primary Examiner* — Edmond C Lau
(74) *Attorney, Agent, or Firm* — Alleman Hall & Tuttle LLP (57) ABSTRACT

Examples are disclosed that relate to display devices having a common light path region. One example provides a display device comprising a light source configured to emit illumination light along an illumination path, and a spatial light modulator configured to modulate the illumination light and emit the modulated illumination light as image light along an imaging path, wherein at least a portion of the illumination path and at least a portion of the imaging path extend through a common light path region. The display device further comprises one or more optical elements positioned within the common light path region, at least one optical element being configured to guide the illumination light as the illumination light travels through the common light path region toward the spatial light modulator, and shape the image light as the image light travels through the common light path region.

19 Claims, 8 Drawing Sheets

DISPLAY DEVICE HAVING COMMON LIGHT PATH REGION

BACKGROUND

In a typical mixed reality display device, a light source emits illumination light that is modulated to produce image light, with which viewable imagery may be formed. To achieve desired illumination and image quality, the treatment of illumination light may be different than the treatment of image light. Such differential treatment may be achieved by directing illumination light and image light along different and physically separate optical paths with differing optical elements.

SUMMARY

Examples are disclosed that relate to display devices having a common light path region. One example provides a display device comprising a light source configured to emit illumination light along an illumination path, and a spatial light modulator configured to modulate the illumination light and emit the modulated illumination light as image light along an imaging path, wherein at least a portion of the illumination path and at least a portion of the imaging path extend through a common light path region. The display device further comprises one or more optical elements positioned within the common light path region, at least one optical element being configured to guide the illumination light as the illumination light travels through the common light path region toward the spatial light modulator, and shape the image light as the image light travels through the common light path region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In a typical mixed reality display device, a light source emits illumination light that is modulated to produce image light, with which viewable imagery may be formed. To achieve desired illumination and image quality, the treatment of illumination light may be different than the treatment of image light. For example, illumination light may be treated to achieve substantially uniform illumination of a spatial light modulator with proper magnification so that illuminated surface of the spatial light modulator is not underfilled or overfilled, whereas the treatment of image light may include focusing image light to produce a viewable image and/or the use of an aperture baffle to suppress the formation of ghost imagery. In some examples, such differential treatment may be achieved by directing illumination light and image light along different and physically separate optical channels or paths with differing optical elements.

Figure 1:
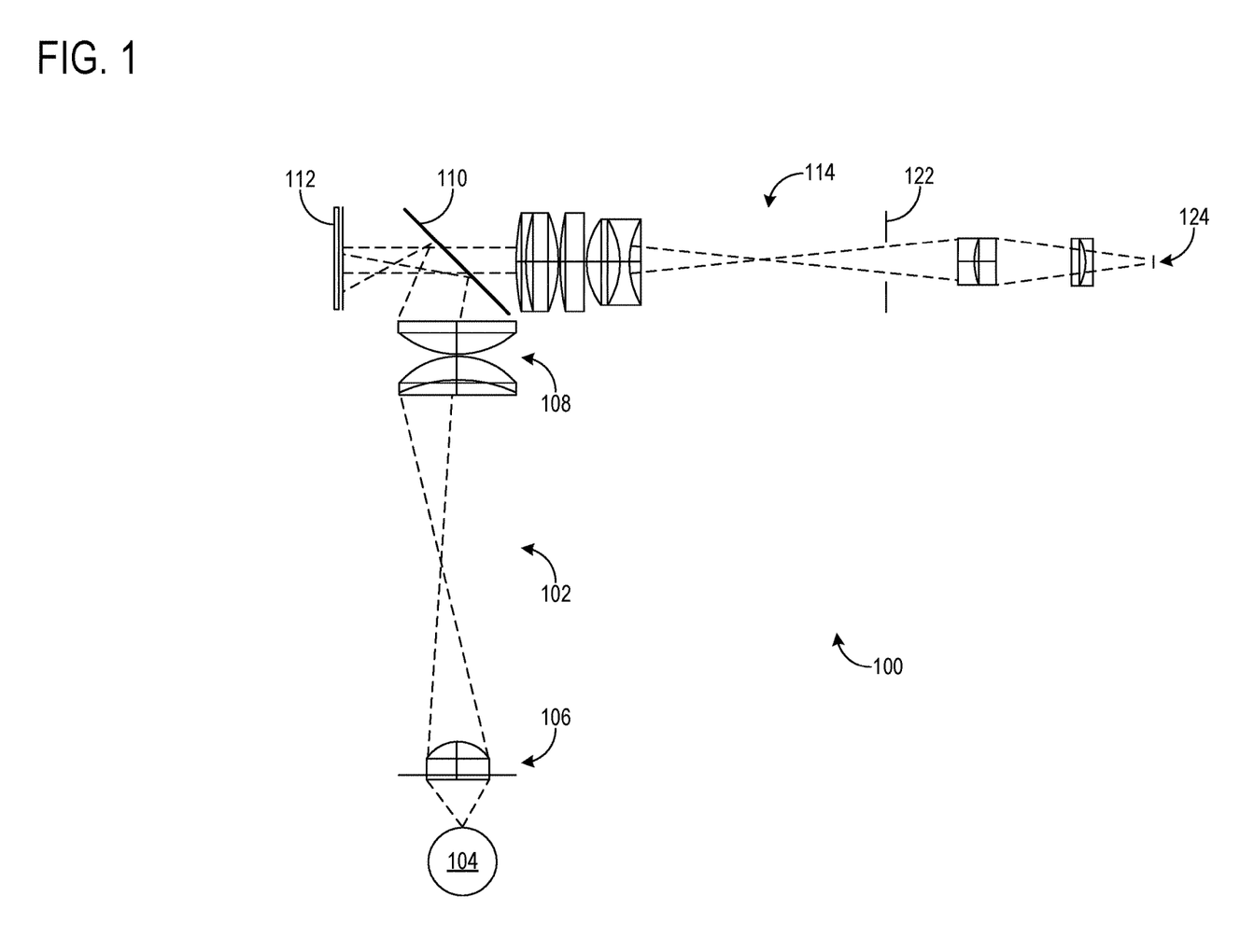
FIG. 1 depicts an example display device having physically separate optical paths for illumination and image light, respectively.

FIG. 1 depicts an example display device 100 in which the differential treatment of illumination light and image light is achieved through the provision of different and physically separate optical channels or paths for illumination and image light, respectively. One such path includes an illumination path 102 along which illumination light is emitted from a light source 104 and is shaped via various optical elements positioned in the illumination path, such as a lens 106 and a lens 108. The illumination light subsequently reflects off a beam splitter mirror 110 to thereby illuminate a spatial light modulator 112 positioned along an imaging path 114. Spatial light modulator 112 modulates impinging illumination light and emits modulated illumination light as image light that subsequently travels along imaging path 114. Imaging path 114 includes various optical elements such as lenses 116, 118, and 120, and an aperture baffle 122 that blocks a portion of the image light, as the image light travels along imaging path 114 toward an end 124 of the imaging path, to thereby suppress the formation of ghost imagery. End 124 of imaging path 114 may correspond to an exit pupil of display device 100 or additional optical elements not shown in FIG. 1 with which viewable imagery may be produced from image light.

In view of the above, the differential treatment of illumination light and image light in display device 100 includes the production of light in illumination path 102 in contrast to the modulation of light in imaging path 114. The differential treatment of illumination light and image light further includes shaping illumination light in illumination path 102 to illuminate spatial light modulator 112 in substantial uniformity across the spatial extent of the illuminated surface of the spatial light modulator without significantly underfilling or overfilling the spatial extent of the illuminated surface, in contrast to restricting a portion of image light via aperture baffle 122 from traveling farther along imaging path 114 toward end 124. Still further, the differential treatment of illumination light and image light includes imaging in illumination path 102 along a finite distance from light source 104 to spatial light modulator 112, in contrast to imaging in imaging path 114 along an infinite distance.

As mentioned above and depicted in the example of FIG. 1, the differential of illumination light and image light is achieved in display device 100 through the use of physically separate illumination and imaging paths 102 and 114 that respectively treat different types of light—i.e., illumination and image light. While the use of physically separate paths enables such differential treatment of light, their use may pose challenges to the physical implementation of display device 100 in form factors that are relatively small, compact, and/or low weight. Such form factors may include head-mounted form factors like that of a mixed reality head-mounted display (HMD), whose design typically prioritizes minimizing size and weight while maximizing user comfort and image quality. The use of respective, separate paths for illumination and image light may render the design of an HMD with such properties difficult or impracticable.

Figure 2:
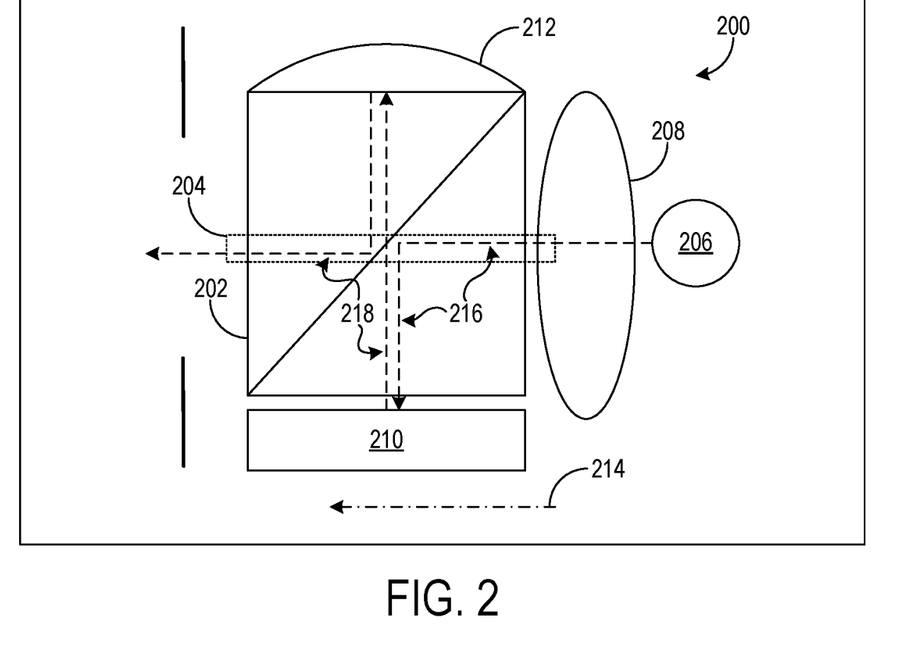
FIG. 2 depicts an example display device in which a beam splitter cube is used to provide a common light path region along which both illumination light and image light travel.

One approach for addressing these issues and providing a compact display device is to consolidate portions of the illumination and imaging paths into a common light path region using a beam splitter cube. FIG. 2 depicts aspects of an example display device 200 in which a beam splitter cube 202 is used to provide a common light path region 204 along which both illumination light and image light travel. In display device 200, illumination light is emitted from a light source 206, travels through an optical element 208 (e.g., a lens), and is subsequently reflected by beam splitter cube 202 toward a spatial light modulator 210. Spatial light modulator 210 modulates impinging illumination light to thereby direct modulated illumination light as image light toward beam splitter cube 202. At least a portion of this image light may transmit through beam splitter cube 202, reflect from a lens 212 coupled to the beam splitter cube, and subsequently reflect from the beam splitter cube toward an exit pupil of display device 200 or additional optical elements not shown in FIG. 2 with which viewable imagery may be produced from image light.

In the example depicted in FIG. 2, common light path region 204 extends along an optical axis 214 of display device 200. Further, a portion of an illumination path 216 along which illumination light travels, as well as a portion of an imaging path 218 along with image light travels, extends through common light path region 204. Various optical elements arranged within common light path region 204, such as beam splitter cube 202, lens 208, and/or other optical elements not shown in FIG. 2 (e.g., diffusive optical elements, convergent lenses, divergent lenses) may treat light in various manners, including but not limited to increasing the diffusion of illumination light as illumination light travels through the common light path region, and focusing image light as image light travels through the common light path region.

Figure 3:
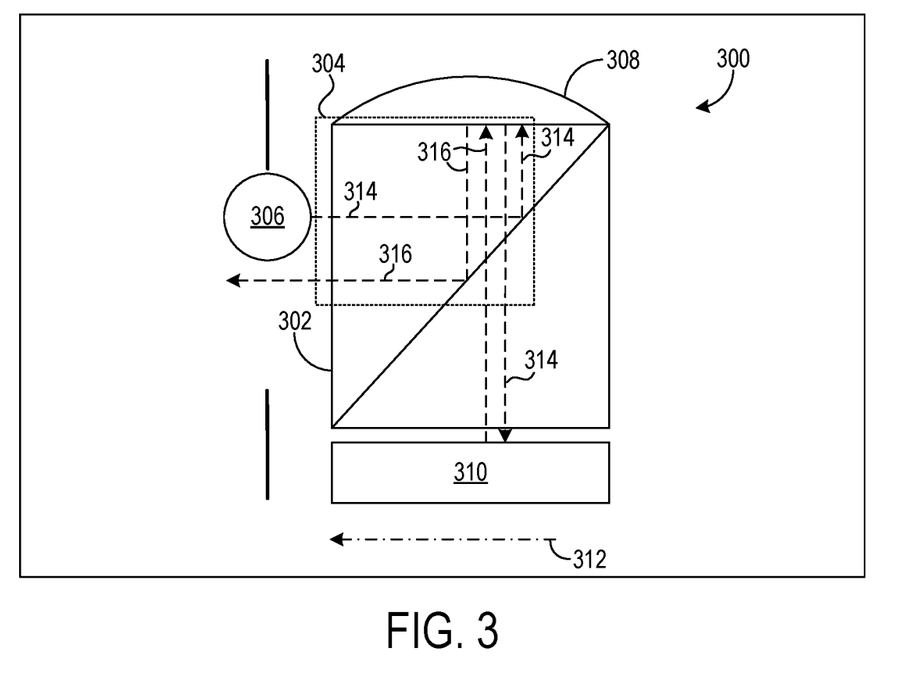
FIG. 3 depicts aspects of another example display device in which a beam splitter cube is used to provide a common light path region along which both illumination light and image light travel.

FIG. 3 depicts aspects of another example display device 300 in which a beam splitter cube 302 is used to provide a common light path region 304 along which both illumination light and image light travel. In display device 300, illumination light is emitted from a light source 306, transmits through beam splitter cube 302 and is reflected by the beam splitter cube toward a lens 308, which then reflects the illumination light toward a spatial light modulator 310. Spatial light modulator 310 modulates impinging illumination light to thereby direct modulated illumination light as image light up toward beam splitter cube 302. At least a portion of this image light may transmit through beam splitter cube 302 up toward lens 308, which may then direct the image light back down toward beam splitter cube 302. Via a mirrored surface of beam splitter cube 308, image light may then be directed toward an exit pupil of display device 300 or additional optical elements not shown in FIG. 3 with which viewable imagery may be produced from image light.

In the example depicted in FIG. 3, common light path region 304 extends along an optical axis 312 of display device 300. Further, a portion of an illumination path 314 along which illumination light travels, as well as a portion of an imaging path 316 along with image light travels, extends through common light path region 304. Various optical elements arranged within common light path region 304, such as beam splitter cube 302, lens 308, and/or other optical elements not shown in FIG. 3 (e.g., diffusive optical elements, convergent lenses, divergent lenses) may treat light in various manners, including but not limited to shaping illumination light by increasing the diffusion of illumination light as illumination light travels through the common light path region, and focusing image light as image light travels through the common light path region to thereby form an image at a focal plane. The shaping of illumination light may include focusing illumination light at a negative focal length, and the focusing of image light may include focusing image light at a positive focal length, for example. More specifically, lens 308 in this example is shared between illumination and imaging paths 314 and 316, and is used in the production and treatment of both illumination light and image light. As such, and in comparison to display device 200 depicted in FIG. 2, the use of lens 308 may enable the omission of lens 208 in display device 300, which may facilitate savings in weight, complexity, and size in a physical implementation of the display device. In the example of FIG. 3, it may be desirable to use a quarter wave plate and/or additional optical components.

It will be understood that light source 206 and spatial light modulator 210, as well as other light sources and spatial light modulators described herein, may assume any suitable form. As examples, a light source may include one or more light-emitting diode (LED) light sources (e.g., monochromatic LED(s), RGB LED(s)) and/or one or more laser light sources. Further, in some examples, a spatial light modulator may include a liquid crystal on silicon (LCoS) display, or in other examples, a digital mirror device (DMD). Spatial light modulators described herein may generate image light by modulating the intensity (e.g., on a per-pixel level) of impinging light, for example.

Figure 4:
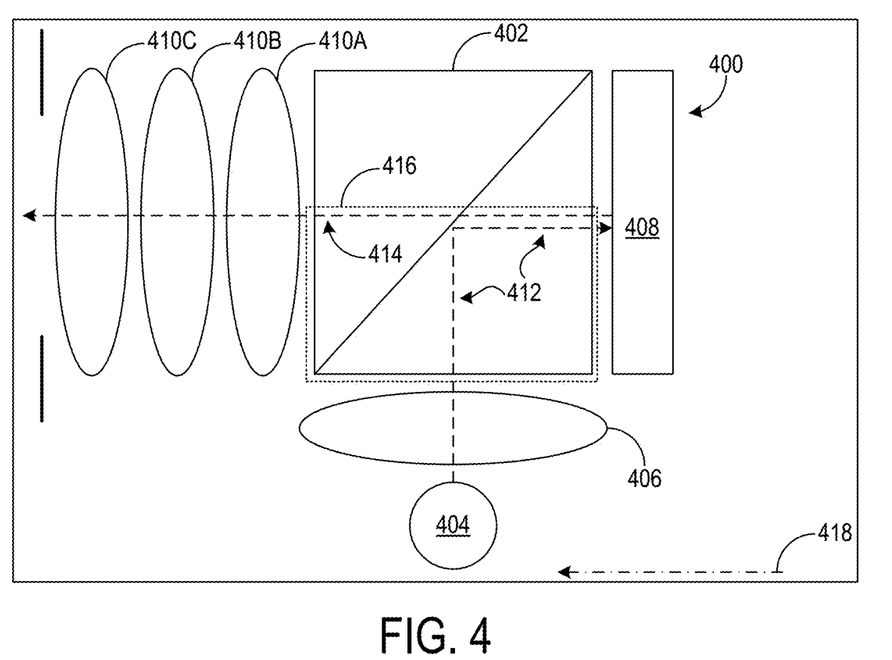
FIG. 4 depicts an example display device in which a beam splitter cube is used to produce and treat illumination and image light.

FIG. 4 depicts an example display device 400 in which a beam splitter cube 402 is used to produce and treat illumination and image light. Display device 400 includes a light source 404 that emits illumination light, which is directed through a collimating optical element 406 that directs collimated illumination light toward beam splitter cube 402. Beam splitter cube 402 directs illumination light toward a spatial light modulator 408, which modulates impinging illumination light and directs modulated illumination light as image light toward the beam splitter cube. At least a portion of the image light is transmitted through beam splitter cube 402 toward projection lenses 410A, 410B, and 410C. Following transmission through projection lenses 410A-410C, image light may be directed toward an exit pupil of display device 400 or additional optical elements not shown in FIG. 4 with which viewable imagery may be produced from image light.

In the example depicted in FIG. 4, illumination light travels along an illumination path 412, and image light travels along an imaging path 414. A portion of illumination path 412 and a portion of imaging path 414 extend through a common light path region 416, which extends along an optical axis 418 of display device 400. Various optical elements arranged within common light path region 416, such as beam splitter cube 402 and/or other optical elements not shown in FIG. 4 (e.g., diffusive optical elements, convergent lenses, divergent lenses) may treat light in various manners, including but not limited to increasing the diffusion of illumination light and/or collimating illumination light as illumination light travels through the common light path region, and focusing image light as image light travels through the common light path region. In the depicted example, image light travels through common light path region 416 in a direction substantially opposite the direction in which a portion of illumination light travels through the common light path region.

As mentioned above, in some examples the omission of a beam splitter cube or mirror may enable implementations with reduced size, weight, and complexity.

Figure 5:
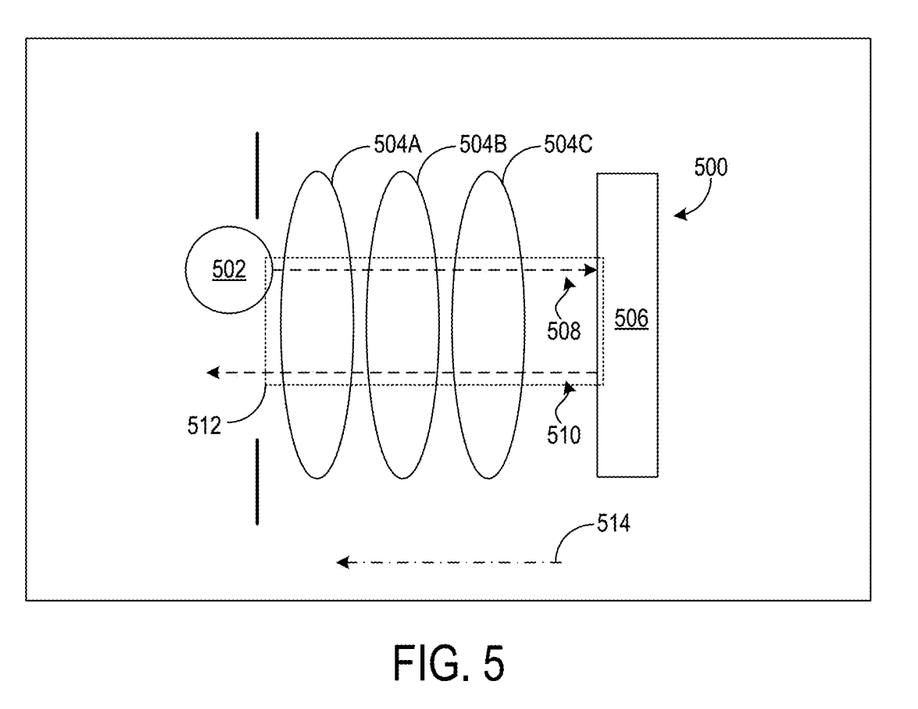
FIG. 5 depicts an example display device in which illumination and image light are treated differently without the use of a beam splitter.

FIG. 5 depicts an example display device 500 in which illumination and image light are treated differently without the use of a beam splitter. Display device 500 includes a light source 502 that directs illumination light through projection lenses 504A, 504B, and 504C, which transmit and direct illumination light toward a spatial light modulator 506. Spatial light modulator 506 modulates impinging illumination light and directs modulated illumination light as image light toward projection lenses 504A-504C, which transmit image light toward an exit pupil or additional optical elements not shown in FIG. 5 with which viewable imagery may be produced from image light. As compared to display device implementations that include a beam splitter, the omission of such an optical element in display device 500 may enable a relatively closer placement between optical elements such as lenses projection 504 and spatial light modulator 506.

In the example depicted in FIG. 5, illumination light travels along an illumination path 508, and image light travels along an imaging path 510. A portion of illumination path 508 and a portion of imaging path 510 extend through a common light path region 512, which extends along an optical axis 514 of display device 500. Various optical elements arranged within common light path region 512, such as light source 502, one or more of projection lenses 504A-504C, and/or other optical elements not shown in FIG. 5 (e.g., diffusive optical elements, convergent lenses, divergent lenses) may treat light in various manners, including but not limited to increasing the diffusion of illumination light as illumination light travels through the common light path region (e.g., toward the spatial light modulator), and focusing image light as image light travels through the common light path region (e.g., in a direction along imaging path 510 substantially opposite the direction in which illumination light travels along illumination path 508).

Figure 6:
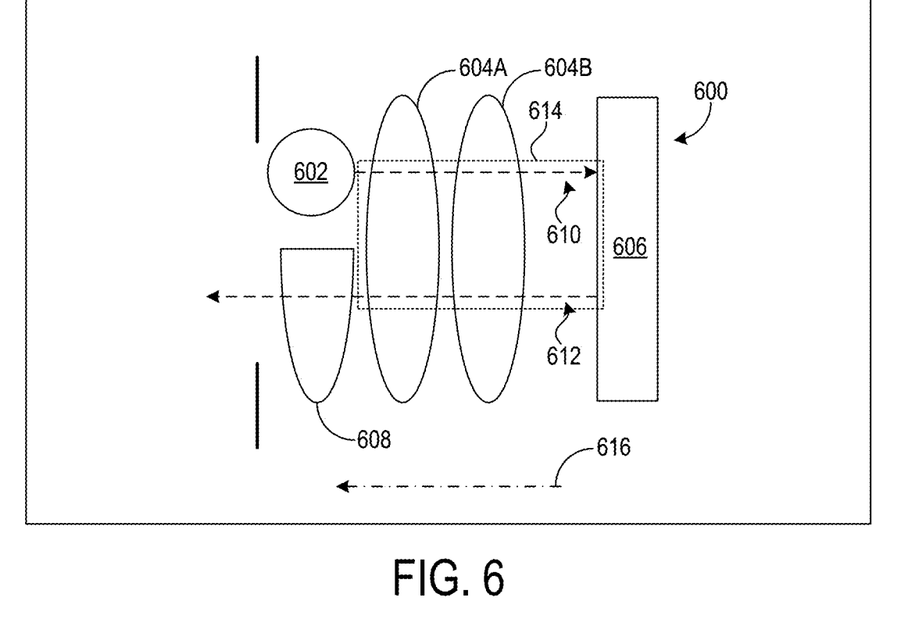
FIG. 6 depicts an example display device in which different optical elements are arranged in illumination and imaging paths.

FIG. 6 depicts another example display device 600 in which different optical elements are arranged in illumination and imaging paths. Display device 600 includes a light source 602 that directs illumination light through projection lenses 604A and 604B, which transmit and direct illumination light toward a spatial light modulator 606. Spatial light modulator 606 modulates impinging illumination light and directs modulated illumination light as image light toward projection lenses 604A and 604B, which transmit image light to a partially cut projection lens 608. Projection lens 608 directs image light to an exit pupil or additional optical elements not shown in FIG. 6 with which viewable imagery may be produced from image light.

In the example depicted in FIG. 6, illumination light travels along an illumination path 610, and image light travels along an imaging path 612. A portion of illumination path 610 and a portion of imaging path 612 extend through a common light path region 614, which extends along an optical axis 616 of display device 600. Various optical elements arranged within common light path region 614, such as projection lenses 604A and 604B, and/or other optical elements not shown in FIG. 6 (e.g., diffusive optical elements, convergent lenses, divergent lenses) may treat light in various manners, including but not limited to increasing the diffusion of illumination light as illumination light travels through the common light path region, and focusing image light as image light travels through the common light path region. In the depicted example, image light travels through common light path region 614 in a direction substantially opposite the direction in which a portion of illumination light travels through the common light path region. In contrast to the optical elements arranged within common light path region 614, projection lens 608 is not shared between illumination path 610 and imaging path 612, and thus treats image light and not illumination light.

Figure 7:
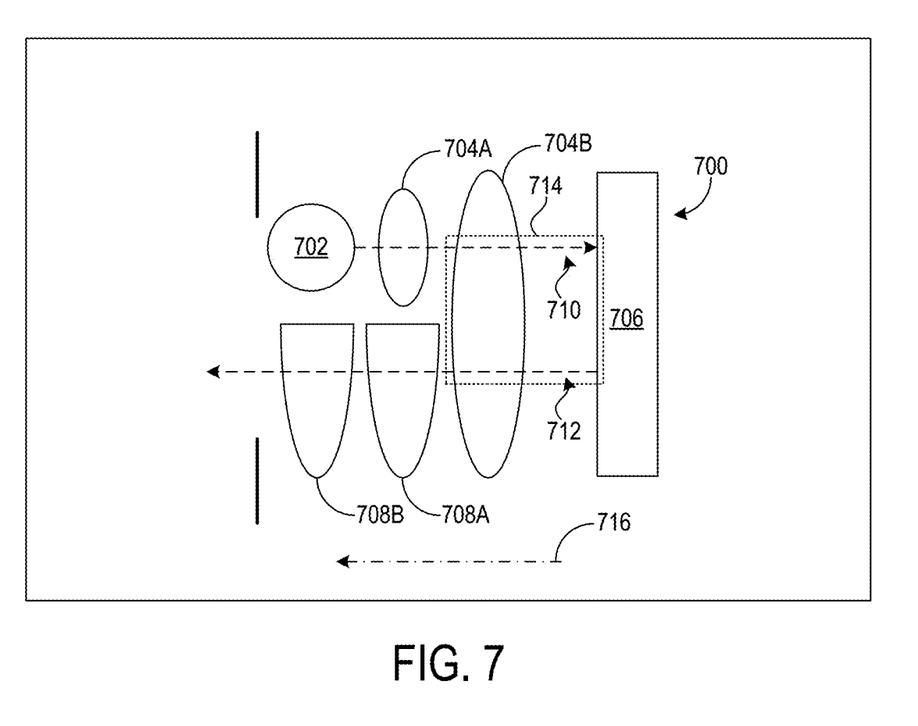
FIG. 7 depicts another example display device in which different optical elements are arranged in illumination and imaging paths.

FIG. 7 depicts another example display device 700 in which different optical elements are arranged in illumination and imaging paths. Display device 700 includes a light source 702 that directs illumination light through projection lenses 704A and 704B, which transmit and direct illumination light toward a spatial light modulator 706. Spatial light modulator 706 modulates impinging illumination light and directs modulated illumination light as image light toward projection lens 704B, which transmits image light to a partially cut projection lens 708A, which in turn transmits image light to another partially cut projection lens 708B. Projection lens 708B then directs image light to an exit pupil or additional optical elements (e.g., input grating of a waveguide) not shown in FIG. 7 with which viewable imagery may be produced from image light.

In the example depicted in FIG. 7, illumination light travels along an illumination path 710, and image light travels along an imaging path 712. A portion of illumination path 710 and a portion of imaging path 712 extend through a common light path region 714, which extends along an optical axis 716 of display device 700. Various optical elements arranged within common light path region 714, such as projection lens 704B and/or other optical elements not shown in FIG. 7 (e.g., diffusive optical elements, convergent lenses, divergent lenses) may treat light in various manners, including but not limited to increasing the diffusion of illumination light as illumination light travels through the common light path region, and focusing image light as image light travels through the common light path region. In the depicted example, image light travels through common light path region 714 in a direction substantially opposite the direction in which a portion of illumination light travels through the common light path region. In contrast to the optical element(s) arranged within common light path region 714, projection lenses 704A, 708A, and 708B are not shared between illumination path 710 and imaging path 712, and thus treat image light and not illumination light.

A partially cut lens such as partially cut lenses 608, 708A, or 708B, may be configured in any suitable manner. In some examples, a portion of a lens (e.g., approximately half of a circular lens) may be physically removed to provide a partially cut lens. In other examples, a lens may not be physically cut but instead logically divided in function—for example, the entrance pupil of a lens may be divided approximately in half such that one half receives and treats illumination light, while the other half receives and treats image light. In yet other examples, a lens may be configured with two or more regions of differing optical power so as to enable the differential treatment of light. Generally, optical elements configured to treat both illumination and image light according to the approaches described herein—e.g., optical elements positioned within a common light path region—may guide and/or shape (i.e., apply optical power to) the illumination and image light.

Display device arrangements other than those described above are further contemplated according to the disclosed approaches. For example, a display device may be provided with optical components such as a mirror or reflective waveguide in lieu of a beam splitter. In other examples in which a display device does employ a beam splitter, the beam splitter may be partially reflective, polarization-sensitive, and/or have section(s) removed to thereby enable the differential treatment of illumination and image light. Generally, display devices may be provided with optical element(s) that are polarization-sensitive, such that such polarization-sensitive optical element(s) treat light of a first polarization differently from light of a second, different polarization. In some examples, the polarization of light may change upon light reflecting from a spatial light modulator. In yet other examples, a display device may be provided with one or more aperture baffles so as to suppress undesired ghost imagery, which may arise from reflections between a waveguide and spatial light modulator, for example. In such examples, the aperture of an image path may be decentered, with only a subset of the aperture being used. Generally, display devices may be provided in which only a subset of the aperture of one or more optical elements is used (e.g., illuminated). In yet other examples, display devices may be provided with one or more optical elements that are not rotationally symmetric, such that illumination light passing through such an optical element may interact with the optical element differently than image light passing through the optical element (e.g., after reflection from a spatial light modulator).

As described above, the treatment of light may include shaping and/or guiding light. As examples, the shaping of light may include one or more of focusing, defocusing, increasing diffusion of, and polarizing light. Further, in some examples, the shaping of light may include imaging to a finite distance or to an infinite distance. Still further, in some examples, the shaping of light may include focusing light to a positive or negative focal length. In some examples, illumination and image light may be differentially shaped—for example, illumination light may be imaged to a finite distance or first focal length, whereas image light may be imaged to an infinite distance or second, different focal length. The differential shaping of illumination and image light may be achieved through the use of one or more common optical elements that perform such differential shaping. The common optical elements may be arranged in a common light path region along which portions of illumination and imaging paths extend, for example.

As examples, the guidance of light may include emitting, directing, redirecting (e.g., via reflection, refraction), or suppressing (e.g., via an aperture baffle or other blocking optics) light. In some examples, the guidance of light may include guiding light to an exit or entrance pupil, or downstream optical elements. In some examples, illumination and image light may be differentially guided—for example, illumination light may be guided from a light source emitting the illumination light to a spatial light modulator configured to generate image light by modulating illumination light, whereas image light may be guided from the spatial light modulator to an exit pupil or downstream optical element(s) through intervening optical element(s). The differential guidance of illumination and image light may be achieved through the use of one or more common optical elements that perform such differential guidance. The common optical elements may be arranged in a common light path region along which portions of illumination and imaging paths extend, for example. Still further, in some examples, illumination and image light may be differentially shaped, differentially guided, or both differentially shaped and differentially guided. Such differential shaping and guidance may be achieved using one or more common optical elements, which may be positioned in a common light path region. It will be understood that optical elements of the display devices described herein may shape and/or guide light in these forms or in any other suitable manner.

Figure 8:
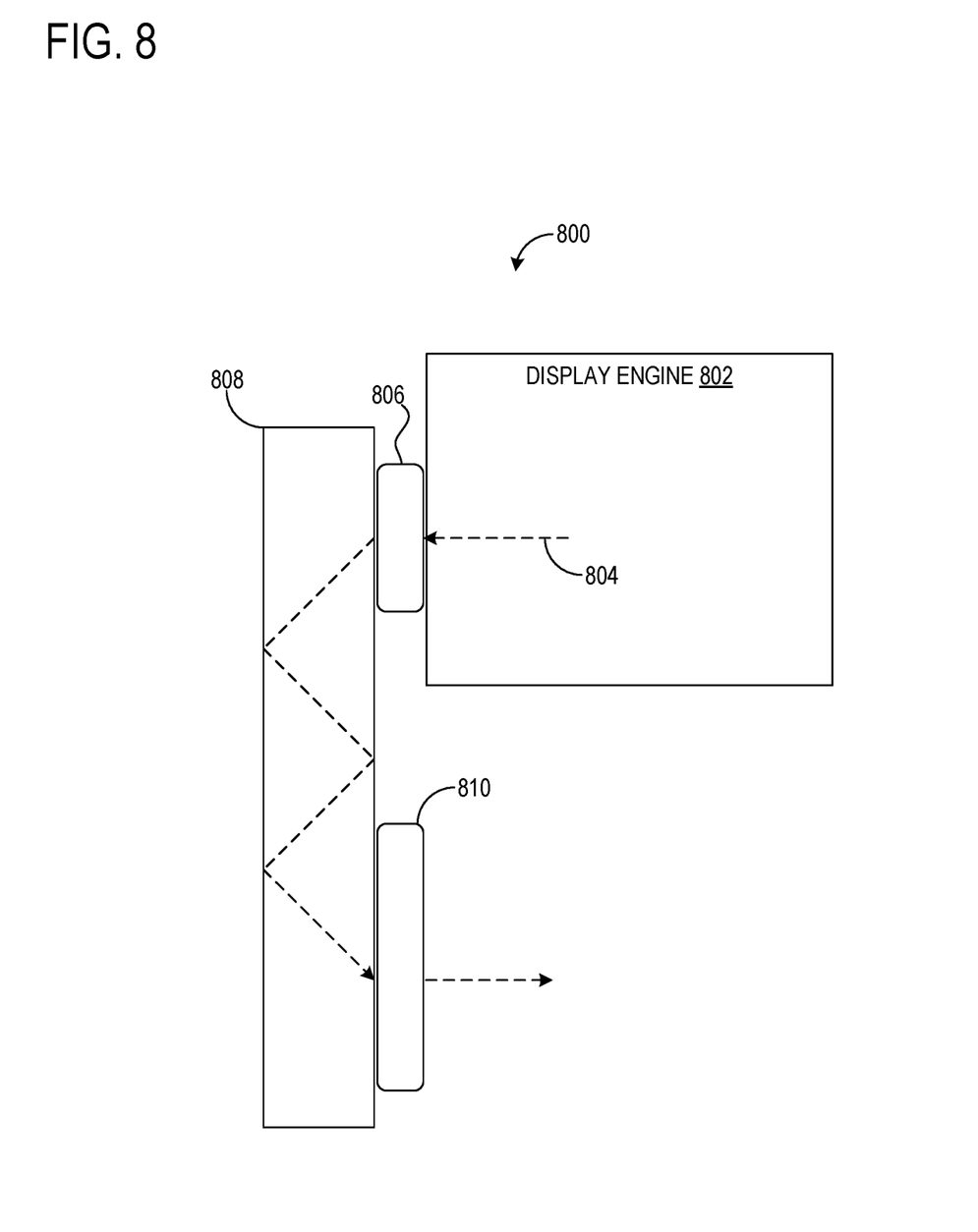
FIG. 8 depicts an example mixed reality display device.

In some examples, one or more of the display devices described herein may form the basis of a display engine that is implemented by a mixed reality display device to produce viewable imagery. In some examples, the imagery may include virtual imagery that is combined with real imagery (e.g., corresponding to the surrounding physical environment) to produce mixed reality imagery—for example, mixed reality imagery that augments the surrounding physical environment. FIG. 8 depicts aspects of an example mixed reality display device 800 including a display engine 802 that emits viewable imagery—represented by a ray 804—for display to a user of the mixed reality display device. Display engine 802 may implement aspects of one or more of display devices 100, 200, 300, 400, 500, 600, and 700, for example. As such, display engine 802 may include illumination and imaging paths along which illumination and image light is respectively produced and treated, where portions of the illumination and imaging paths extend along a common light path region that extends along an optical axis of the display engine and/or display device 800.

Image light emitted by display engine 802 is directed to an input grating 806 of a waveguide 808 to thereby inject image light into the waveguide. Waveguide 808 includes an output grating 810 that outcouples image light received from within the waveguide that meets an angular condition of the waveguide, where the outcoupled image light may be directed to an exit pupil of display device 800 or additional optical elements not shown in FIG. 8 with which viewable imagery may be produced from image light.

Figure 9:
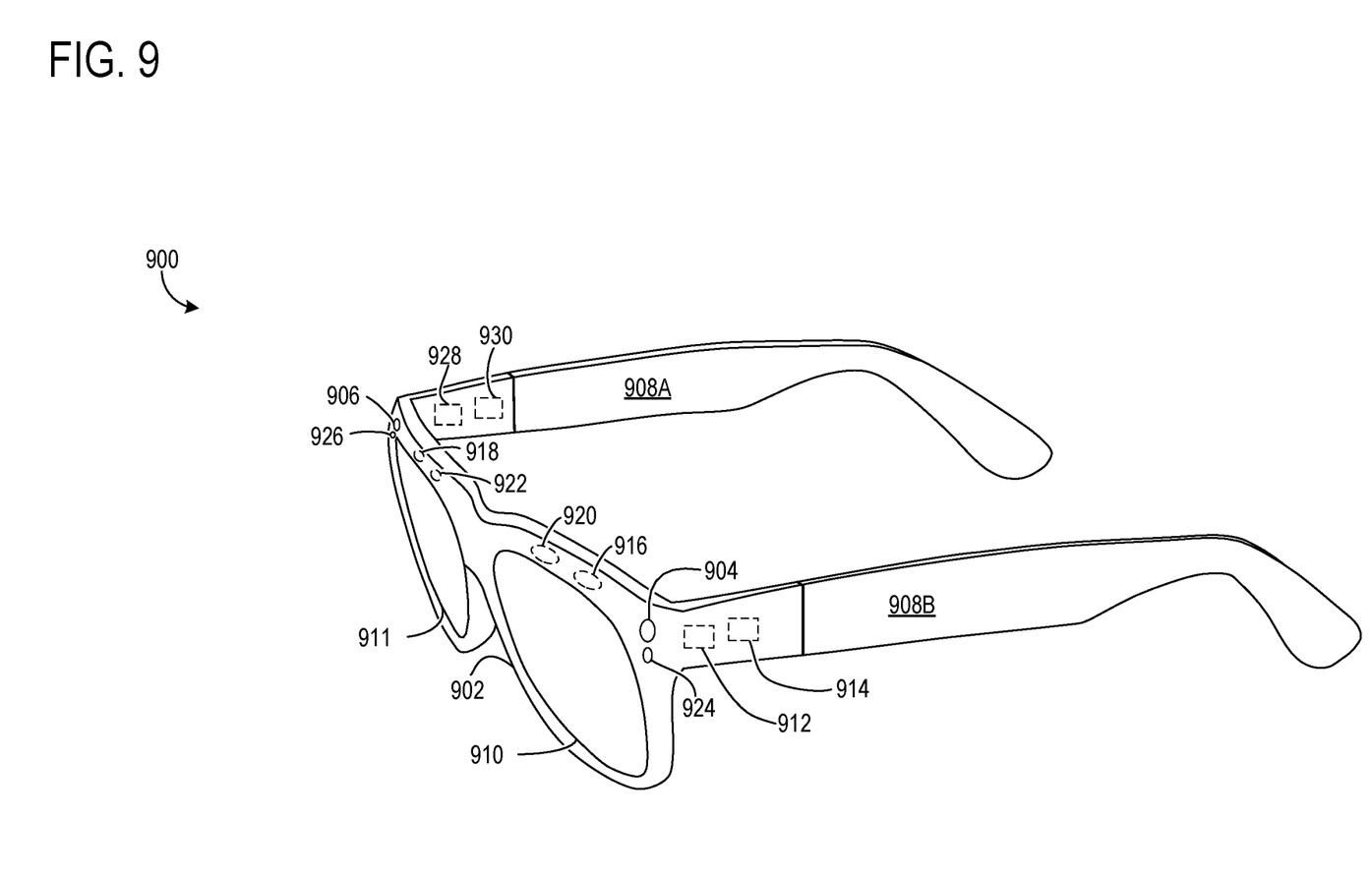
FIG. 9 depicts an example wearable display device in the form of a mixed reality head-mounted display.

In some examples, a wearable display device such as a mixed reality head-mounted display (HMD) may implement aspects of one or more of display devices 100, 200, 300, 400, 500, 600, 700, and 800. FIG. 9 schematically shows an example wearable display device 900 in the form of a mixed reality HMD comprising a frame 902, a first camera 904, a second camera 906, a display device, and temple pieces 908. In this example, the display device comprises a first display 910 and a second display 911 supported by frame 902, wherein each of the first display and the second display takes the form of a waveguide configured to deliver imagery to a respective eye of a user. First camera 904 and second camera 906 in this example comprise head tracking cameras located respectively at left and right sides of frame 902, wherein each of the first camera and the second camera is located on the frame adjacent to an outer edge of the frame. A wearable display device may further comprise other sensors that include aligned left and right components. For example, wearable display device 900 includes an eye tracking system comprising a first eye tracking camera 916 and a second eye tracking camera 918, a face tracking system comprising a first face tracking camera 920 and a second face tracking camera 922, and a hand tracking system comprising a first hand tracking camera 924 and a second hand tracking camera 926. Data from the eye tracking system, the face tracking system, and/or the hand tracking system may be used to detect user inputs, and also may be used to help render the stereo image in various examples.

Wearable display device 900 further comprises a first display engine 912 positioned adjacent to first camera 904 for displaying a first image of the stereo image and a second display engine 928 positioned adjacent to second camera 106 for displaying a second image of the stereo image. Each display engine may implement aspects of one or more of display devices 100, 200, 300, 400, 500, 600, 700, and 800, for example. As such, each display engine may implement various optics, including but not limited to waveguides, one or more lenses, prisms, and/or other optical elements that may be used to deliver imagery to a user's eyes. Each display engine may implement an illumination path along which illumination light is produced and treated, an imaging path along which image light is produced and treated, and a common light path region along which at least portions of the illumination and imaging paths extend. In other examples, a single display engine may be used to deliver imagery to one or both eyes of a user.

A wearable display device further may include other types of sensors sensitive to misalignment due to bending. For example, wearable display device 900 comprises an inertial measurement unit system (IMU) comprising a first IMU 914 positioned adjacent to first display module 912 and a second IMU 930 positioned adjacent to second display module 928. First camera 904, first display engine 912, and first IMU 914 may be closely mechanically coupled to help prevent changes in alignment from occurring between the first camera, the first display engine, and the first IMU. Second camera 906, second display module 928, and second IMU 930 may be similarly closely mechanically coupled. IMU data can be used to adjust a displayed image based upon head motion.

Figure 11:
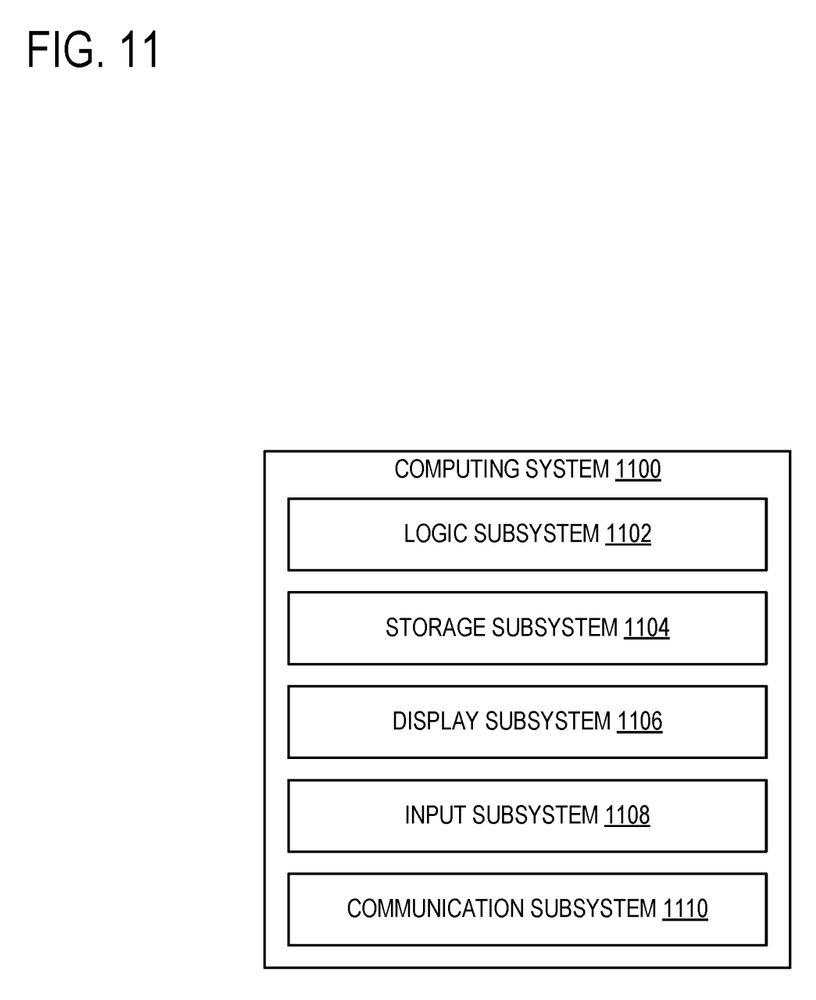
FIG. 11 depicts a block diagram of an example computing system.

Wearable display device 900 may include a controller comprising a logic subsystem and a storage subsystem, examples of which are discussed in more detail in FIG. 11. The storage subsystem may store instructions executable by the logic subsystem to effect various actions at wearable display device 900, including but not limited to causing the generation of imagery that is displayed on the wearable display device.

As mentioned above, a displayed stereo image can be rendered based upon head tracking data captured by a head tracking subsystem. Head tracking data can be used to determine a location of the device in an environment and a distance from the device to objects in the environment. This data can then be used to determine left-eye and right-eye images to display that place imagery in an intended position (e.g. on top of a table or on a wall). An inertial measurement unit (IMU) subsystem may be used in combination with the head tracking subsystem to help determine the location of the device in the environment, such as by tracking head movement. Other sensor data that may be used to render imagery includes eye tracking data from an eye tracking system comprising eye tracking camera(s), face tracking data from a face tracking subsystem comprising face tracking camera(s), and hand tracking data from a hand tracking subsystem comprising hand tracking camera(s). Eye tracking data from the eye tracking subsystem may be used to determine a gaze direction, which can be used to place imagery in an environment and/or for detecting eye gesture inputs for interacting with the imagery. Face tracking data from the face tracking subsystem and hand tracking data from the hand tracking subsystem may be used as face gesture inputs and hand gesture inputs, respectively, to interact with imagery.

Figure 10:
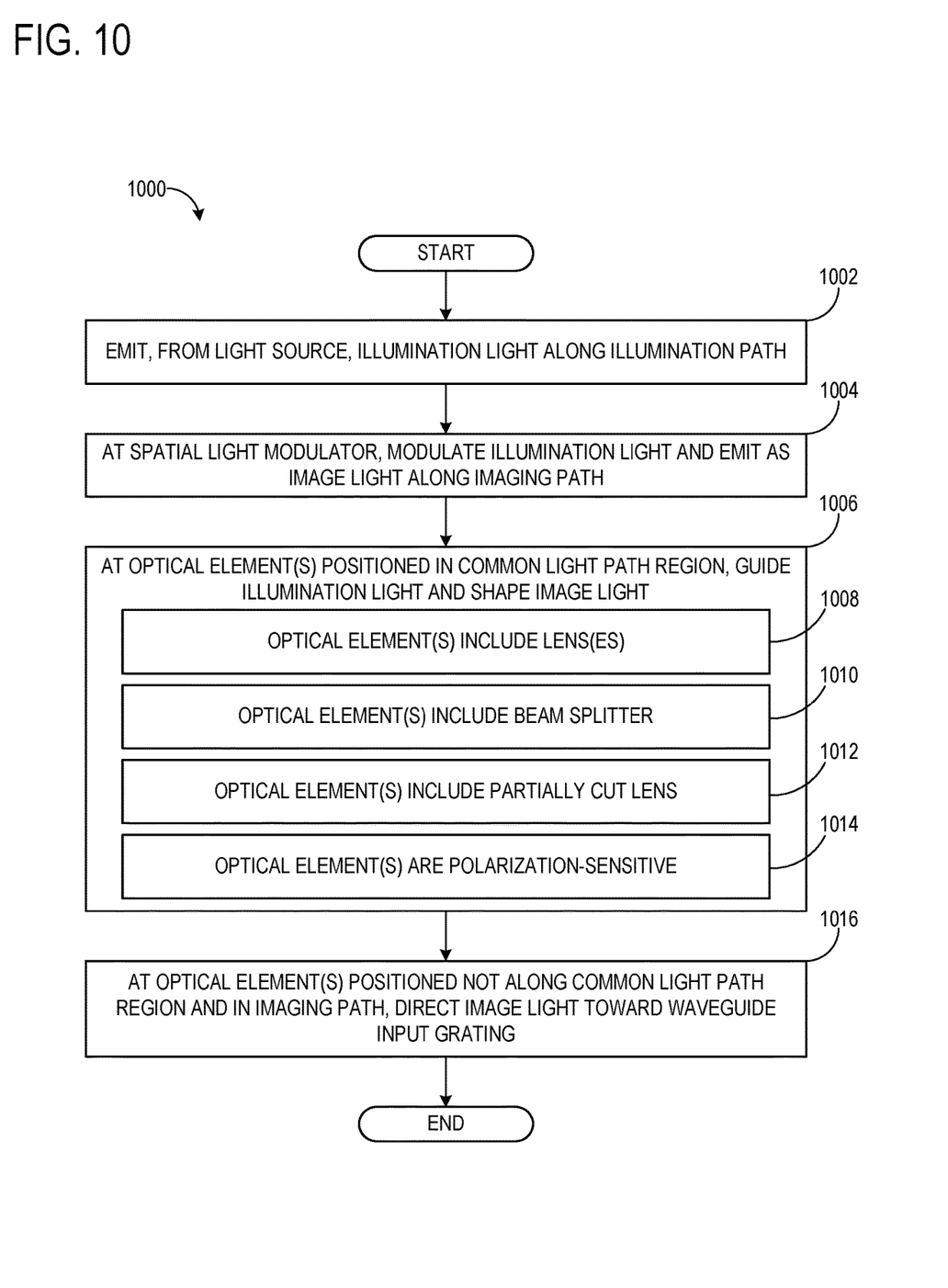
FIG. 10 depicts a flowchart illustrating an example method of forming an image.

FIG. 10 shows a flowchart depicting an example method 1000 of forming an image. Method 1000 may be implemented at one or more of display devices 100, 200, 300, 400, 500, 600, 700, and 800, for example.

At 1002, method 1000 includes emitting, from a light source, illumination light along an illumination path. At 1004, method 1000 includes, at a spatial light modulator, modulating the illumination light and emitting the modulated illumination light as image light along an imaging path, wherein at least a portion of the illumination path and at least a portion of the imaging path extend through a common light path region extending along an optical axis of the display device.

At 1006, method 1000 includes, at at least one optical element of one or more optical elements positioned within the common light path region, (1) guiding the illumination light as the illumination light travels through the common light path region toward the spatial light modulator, and (2) shaping the image light as the image light travels through the common light path region. The optical element(s) may include one or more lenses 1008. The optical element(s) may include a beam splitter mirror or cube 1010. The optical element(s) may include a partially cut lens 1012. The optical element(s) may be polarization-sensitive 1014. In such examples, light of a first polarization may be treated, at the polarization-sensitive optical element(s), differently than light of a second polarization. At 1016, method 1000 includes, at one or more optical elements that are not positioned along the common light path region and that are positioned along the imaging path and not the illumination path, directing image light toward an input grating of a waveguide.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic subsystem 1102 and a storage subsystem 1104. Computing system 1100 may optionally include a display subsystem 1106, input subsystem 1108, communication subsystem 1110, and/or other components not shown in FIG. 11.

Logic subsystem 1102 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 1104 includes one or more physical devices configured to hold instructions executable by the logic subsystem to implement the methods and processes described herein. When such methods and processes are implemented, the state of storage subsystem 1104 may be transformed—e.g., to hold different data.

Storage subsystem 1104 may include removable and/or built-in devices. Storage subsystem 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1104 may include volatile, nonvolatile, dynamic, static, read/write, read-only, random-access, sequential-access, location-addressable, file-addressable, and/or content-addressable devices.

It will be appreciated that storage subsystem 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1102 and storage subsystem 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic subsystem 1102 executing instructions held by storage subsystem 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1106 may be used to present a visual representation of data held by storage subsystem 1104. This visual representation may take the form of a graphical user interface (GUI). As the herein described methods and processes change the data held by the storage subsystem, and thus transform the state of the storage subsystem, the state of display subsystem 1106 may likewise be transformed to visually represent changes in the underlying data. Display subsystem 1106 may include one or more display devices utilizing virtually any type of technology. Such display devices may be combined with logic subsystem 1102 and/or storage subsystem 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

According to one example, the disclosure is directed to a display device having (1) a light source configured to emit illumination light along an illumination path; (2) a spatial light modulator configured to receive and modulate the illumination light, and emit the modulated illumination light as image light along an imaging path, wherein at least a portion of the illumination path and at least a portion of the imaging path extend through a common light path region extending along an optical axis of the display device; and (3) one or more optical elements positioned within the common light path region, at least one optical element of the one or more of optical elements being configured to (a) guide the illumination light as the illumination light travels through the common light path region toward the spatial light modulator, and (b) shape the image light as the image light travels through the common light path region.

In the above example, the one or more optical elements may include one or more of (1) lenses, (2) a beam splitter, and (3) a partially cut lens. The spatial light modulator may include one of a liquid crystal on silicon display or a digital mirror device.

In the above example, the display device further may further include one or more optical elements that are not positioned along the common light path region and that are positioned along the imaging path and not the illumination path, with such optical elements being configured to direct the image light toward an input grating of a waveguide. In the above example, the display device may further include one or more optical elements that are not positioned along the common light path region and that are positioned along the illumination path and not the imaging path.

In the above example display device, at least one optical element of the one or more optical elements may be polarization-sensitive, such that the at least one optical element is configured to treat light of a first polarization differently than light of a second polarization.

In the above example display device, the one or more optical elements may be configured to apply optical power to the image light, and the display device may further include an aperture baffle positioned along the imaging path.

According to a second example, a method of forming an image at a display device is disclosed. Such method include (1) emitting, from a light source, illumination light along an illumination path; (2) at a spatial light modulator, modulating the illumination light and emitting the modulated illumination light as image light along an imaging path, wherein at least a portion of the illumination path and at least a portion of the imaging path extend through a common light path region extending along an optical axis of the display device; and (3) at least one optical element of one or more optical elements positioned within the common light path region, (a) guiding the illumination light as the illumination light travels through the common light path region toward the spatial light modulator, and (b) shaping the image light as the image light travels through the common light path region.

In the above example method, the one or more optical elements may include one or more of (1) lenses; (2) a beam splitter; and (3) a partially cut lens. The example method may further include, at one or more optical elements that are not positioned along the common light path region and that are positioned along the imaging path and not the illumination path, directing image light toward an input grating of a waveguide. In the example method, at least one optical element of the one or more optical elements may be polarization-sensitive so as to treat light of a first polarization differently than light of a second polarization.

According to another example, the disclosure calls for a mixed reality display device, which includes a frame and a display engine. The display engine includes (1) a light source configured to emit illumination light along an illumination path; (2) a spatial light modulator configured to receive and modulate the illumination light, and emit the modulated illumination light as image light along an imaging path, wherein at least a portion of the illumination path and at least a portion of the imaging path extend through a common light path region extending along an optical axis of the display device; and (3) one or more optical elements positioned within the common light path region, at least one optical element of the one or more optical elements being configured to (a) guide the illumination light as the illumination light travels through the common light path region toward the spatial light modulator, and (b) shape the image light as the image light travels through the common light path region. The mixed reality display device further includes one or more displays configured to generate imagery based on the image light; and a waveguide configured to receive the image light and direct the image light toward the one or more displays. The one or more optical elements may include a partially cut lens, and the mixed reality display device may further include one or more optical elements that are not positioned along the common light path region and that are positioned along the imaging path and not the illumination path.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:
a light source configured to emit illumination light along an illumination path, the illumination light used to achieve illumination of a spatial light modulator;
the spatial light modulator configured to receive and modulate the illumination light, and emit the modulated illumination light as image light along an imaging path, wherein at least a portion of the illumination path and at least a portion of the imaging path extend through a common light path region extending along an optical axis of the display device; and
two or more optical elements positioned within the common light path region, at least one optical element of the two or more of optical elements being configured to (1) guide the illumination light as the illumination light travels through the common light path region toward the spatial light modulator, and (2) shape the image light as the image light travels through the common light path region, the two or more optical elements including a lens within the common light path region configured to both transmit the illumination light prior to modulation by the spatial light modulator, and also transmit the image light after modulation by the spatial light modulator, and the two or more optical elements including a partially cut lens positioned within the common light path region.

2. The display device of claim 1, wherein the two or more optical elements include two or more lenses.

3. The display device of claim 1, wherein the two or more optical elements include a beam splitter.

4. The display device of claim 1, wherein the spatial light modulator includes one of a liquid crystal on silicon display or a digital minor device.

5. The display device of claim 1, further comprising one or more imaging optical elements that are not positioned along the common light path region and that are positioned along the imaging path and not the illumination path.

6. The display device of claim 5, wherein the one or more imaging optical elements are configured to direct the image light toward an input grating of a waveguide.

7. The display device of claim 1, further comprising one or more illumination optical elements that are not positioned along the common light path region and that are positioned along the illumination path and not the imaging path.

8. The display device of claim 1, where at least one optical element of the two or more optical elements is polarization-sensitive, such that the at least one optical element is configured to treat light of a first polarization differently than light of a second polarization.

9. The display device of claim 1, where the two or more optical elements apply optical power to the image light.

10. The display device of claim 1, further comprising an aperture baffle positioned along the imaging path.

11. The display device of claim 1, wherein the partially cut lens has a semi-circular shape and is constructed by removing a portion of a whole lens.

12. The display device of claim 1, wherein the partially cut lens includes a portion that receives and treats illumination light, and a second portion that receives and treats image light.

13. The display device of claim 1, wherein the partially cut lens includes two or more regions of differing optical power.

14. At a display device, a method of forming an image, the method comprising:
   emitting, from a light source, illumination light along an illumination path, the illumination light used to achieve illumination of a spatial light modulator;
   at the spatial light modulator, modulating the illumination light and emitting the modulated illumination light as image light along an imaging path, wherein at least a portion of the illumination path and at least a portion of the imaging path extend through a common light path region extending along an optical axis of the display device; and
   two or more optical elements positioned within the common light path region, (1) guiding the illumination light as the illumination light travels through the common light path region toward the spatial light modulator, and (2) shaping the image light as the image light travels through the common light path region, the two or more optical elements including at least one element to transmit the illumination light prior to modulation by the spatial light modulator, and a series of two or more lenses to transmit the image light after modulation by the spatial light modulator, the two or more lenses including a partially cut lens positioned within the common light path region.

15. The method of claim 14, wherein the two or more optical elements include a beam splitter.

16. The method of claim 14, further comprising, at one or more imaging optical elements that are not positioned along the common light path region and that are positioned along the imaging path and not the illumination path, directing image light toward an input grating of a waveguide.

17. The method of claim 14, wherein at least one optical element of the one or more imaging optical elements is polarization-sensitive, further comprising, at the at least one optical element, treating light of a first polarization differently than light of a second polarization.

18. A mixed reality display device, comprising:
   a frame;
   a display engine, comprising:
      a light source configured to emit illumination light along an illumination path, the illumination light used to achieve illumination of a spatial light modulator;
      the spatial light modulator configured to receive and modulate the illumination light, and emit the modulated illumination light as image light along an imaging path, wherein at least a portion of the illumination path and at least a portion of the imaging path extend through a common light path region extending along an optical axis of the display device; and
      two or more optical elements positioned within the common light path region, at least one optical element of the two or more optical elements being configured to (1) guide the illumination light as the illumination light travels through the common light path region toward the spatial light modulator, and (2) shape the image light as the image light travels through the common light path region, the two or more optical elements including a lens within the common light path region configured to both transmit the illumination light prior to modulation by the spatial light modulator, and also transmit the image light after modulation by the spatial light modulator, and the two or more optical elements including a partially cut lens positioned within the common light path region;
   one or more displays configured to generate imagery based on the image light; and
   a waveguide configured to receive the image light and direct the image light toward the one or more displays.

19. The mixed reality display device of claim 18, further comprising one or more imaging optical elements that are not positioned along the common light path region and that are positioned along the imaging path and not the illumination path.

* * * * *